United States Patent [19]

Böhnke et al.

[11] Patent Number: 4,568,462

[45] Date of Patent: Feb. 4, 1986

[54] METHOD OF TREATING SEWAGE IN SEWAGE TREATMENT INSTALLATIONS HAVING AN ADSORPTION STAGE

[76] Inventors: Botho Böhnke, Maria-Theresia Allee 231; Bernd Diering, Martin-Luther-Str. 10, both of 5100 Aachen, Fed. Rep. of Germany

[21] Appl. No.: 609,191

[22] Filed: May 11, 1984

[30] Foreign Application Priority Data

May 13, 1983 [DE] Fed. Rep. of Germany ....... 3317371

[51] Int. Cl.⁴ .............................................. C02F 3/30
[52] U.S. Cl. .................................... 210/605; 210/611; 210/620
[58] Field of Search ............... 210/605, 606, 611, 610, 210/620, 630

[56] References Cited

U.S. PATENT DOCUMENTS

| | | | |
|---|---|---|---|
| 3,652,406 | 3/1972 | Westberg | 210/610 |
| 3,764,523 | 10/1973 | Stankewich | 210/610 X |
| 3,973,043 | 8/1976 | Lynn | 210/605 X |
| 4,134,830 | 1/1979 | Skogman et al. | 210/605 X |
| 4,213,857 | 7/1980 | Ishida et al. | 210/611 X |
| 4,356,092 | 10/1982 | Shimizu et al. | 210/611 |

FOREIGN PATENT DOCUMENTS 2908134 9/1980 Fed. Rep. of Germany .
2640875 1/1983 Fed. Rep. of Germany .

Primary Examiner—Thomas Wyse
Attorney, Agent, or Firm—Karl F. Ross; Herbert Dubno

[57] ABSTRACT

A method of treating municipal and/or industrial sewage in a plurality of activation stages including a high-loading initial adsorption stage in which the biomass consists of procaryotae and make-up biomass in the form of procaryotae is introduced with the sewage in an amount per volume of one weight percent of the working biomass in the adsorption stage per unit volume to stabilize the treatment against pH shock, salt shock and toxic shock.

5 Claims, 1 Drawing Figure

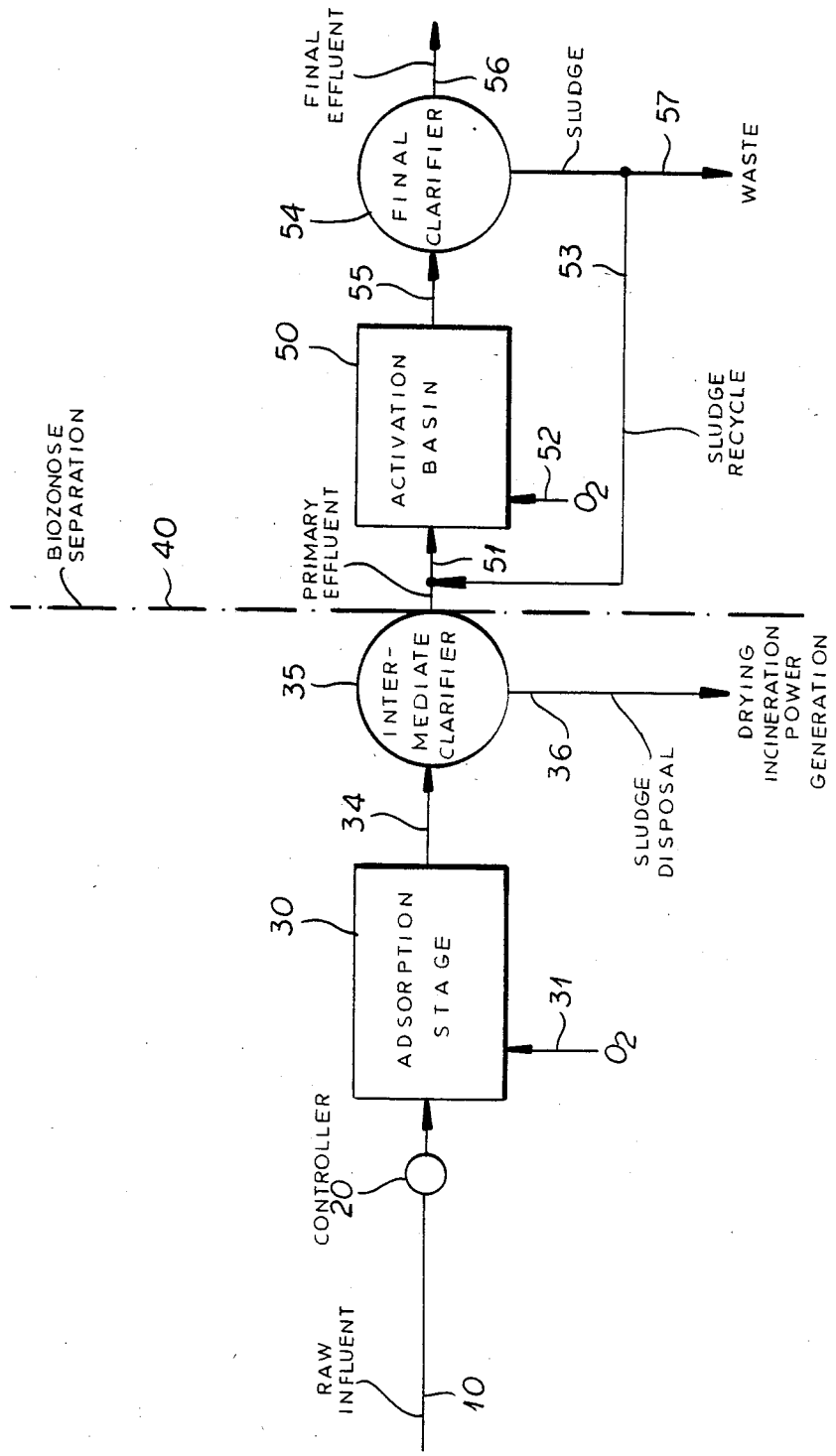

METHOD OF TREATING SEWAGE IN SEWAGE TREATMENT INSTALLATIONS HAVING AN ADSORPTION STAGE

FIELD OF THE INVENTION

Our present invention relates to a method of treating sewage, i.e. industrial and/or municipal waste water in an activated sludge process and, more particularly in such a process or installation which has an adsorption stage.

BACKGROUND OF THE INVENTION

In the activated sludge systems known in the art for the treatment of sewage, it is a common practice to provide a series of stages, each of which can be provided with an activated sludge basin followed by a separator such as a settling tank or clarifier from which sludge is separated from an effluent which can be passed to the next stage. A portion of the sludge may be recycled to the activation basin and excess sludge can be wasted or further processed. The effluent of each earlier stage can be treated in the activation basin of the next stage until a final effluent is produced in the cascade. The influent to the first stage is generally treated to remove large objects and masses, e.g. by screening, or untreated waste water can be introduced into a primary clarifier to settle out materials including high molecular weight organisms which can prove troublesome in the biological treatments which are to follow.

The activation basins can be provided with means for introducing oxygen (as air, oxygen enriched air or technically pure oxygen).

Among these biological waste-treatment systems, there are those which treat the waste water, a term which will be utilized hereinafter to mean municipal sewage, industrial waste waters and mixtures or combinations thereof unless further specified, in a two-stage activated sludge process in which the first activation stage is operated as an adsorption stage with a sludge loading of at least 2 kg $BOD_5$ per kg of dry substance per day in an aerobic or facultative anaerobic mode and the bizonoses of the first and second activation stages are separated from one another.

The term "biozonose" is here utilized in its usual meaning to define the entire biological universe represented by the successive stages and in the sense of the term "biozone" to indicate that the biological conditions prevailing in the second or subsequent zone are not to be imported into the first or earlier zone.

A strict separation can be maintained by effective removal of sludge from the effluent of the first stage so that only the clarified effluent from the first stage enters the activation basin of the second stage and by ensuring that no sludge from the second stage clarifier is recycled to the activation basin of the first stage.

Such processes are continuous processes in the art and the adsorption stage can be denoted as an A-stage in the technical literature dealing with such treatments.

The separation of the biozonoses is effected as noted by an intermediate clarifier and by preventing sludge from the second or further activation stages from being recycled to the first high-loading activation stage.

In the adsorption stage, the sludge is maintained in a break-in phase by appropriate separation of sludge in the intermediate clarifier and its recycling to the activation basin, whereby substrate respiratory decomposition is initiated. In order to maintain the sludge in the first activation stage in this state, it is essential that the sludge age be minimized by a correspondingly controlled removal of sludge at the intermediate clarifier.

Where the volumetric loading is about 10 kg $BOD_5$ per $m^3$ per day in the first activation stage, it is possible to effect the splitting or cracking in adsorption and/or flocculation of the higher molecular weight compounds so that the decomposition products can be removed from the effluent and the first activation basin with the excess sludge from the first stage in the intermediate clarifier. It is thus possible to eliminate the need to utilize the energy required in other processes for the full biological degradation of these compounds.

In subsequent activation stages, the lower molecular weight and more readily biologically degradable compounds can be decomposed especially easily and rapidly.

This can be done in various ways including the so-called AB process described in German open application No. DE-OS 26 40 875 and the so-called ATB process described in German open application No. DE-OS 29 08 134. However, while these systems have been found to be generally satisfactory, it has been discovered that the first stage is particularly sensitive to various destabilizing factors such as sudden changes in pH, salt concentrations and toxic-element levels or the like.

OBJECTS OF THE INVENTION

It is the principal object of the present invention to provide an improved process of the type described whereby the disadvantages outlined above of earlier systems are obviated.

Another object of this invention is to provide a process having two or more stages including a high-loading adsorption stage with separation of the biozonoses and which is less susceptible to destabilizing factors such as pH shock, salt shock, toxic shock and the like.

SUMMARY OF THE INVENTION

These objects and others which will become apparent hereinafter are attained in accordance with the present invention in a method of treating waste water as defined above wherein in the first activation stage, a sludge loading of at least 2 kg $BOD_5$ per kg of dry substance per day is maintained, the activated sludge aerobic or facultative anaerobic digestion is effected in an adsorption stage and strict separation of biozonoses of the first and second stages is maintained by the intermediate clarifier and the nonrecirculation of the activated sludge from the second stage or any specific stage to the first stage. According to the invention, the adsorption stage is operated with procaryotic microorganisms (procaryotae). As the working biomass and make-up procaryotae are supplied to the activation basin of this adsorption stage in an amount of at least 1 weight percent of the working biomass per unit volume of the adsorption stage, per unit volume of the influent.

In other words, where the adsorption stage has a working biomass M per unit volume V of the adsorption stage, the concentration of the procaryotic microorganisms in the influent is adjusted to at least 1 weight percent of this value M per unit volume of the influent. The reference to percent of the working biomass, as this expression is utilized hereinafter, is to be understood in these terms. Preferably we maintain a concentration of at least 2 weight percent of the working biomass per unit volume of the influent and add any necessary amounts of the procaryotic microorganisms required in such maintenance before the influent enters the first activation stage which is operated as an adsorption stage in the system of the invention.

Procaryotae, for the purposes of the present invention, are especially the protocytes and intestinal bacterial (Hans G. Schlegel "Allgemeine Mikrobiologie", 1981, Section 3., 3.1 to 3.16).

The invention utilizes our discovery that such procaryotic microorganisms can serve as the replacement biomass in a multistage activated sludge process when incorporated into the raw influent to effect a significant stabilization of the adsorption stage against the effects described previously, such as pH shock, salt shock and toxic shock.

Preferably the raw water is introduced into the adsorption stage without preclarification although a partial clarification can initially be effected and the quantity of the make-up biomass is controlled by varying the rate at which the raw water is introduced and/or the degree of any preclarification.

Especially, according to the invention, the procaryotic microorganisms are introduced in municipal sewage.

Where the method of the invention is utilized for the treatment of municipal sewage, an especially stable operation can be ensured if the make-up biomass is introduced in an amount of 5 to 15 weight percent of the working biomass in the adsorption stage. When the method is utilized for the treatment of industrial waste water containing procaryotae or to which procaryotae are added, the influent should contain 1 to 5 weight percent procaryotae.

These ranges, while preferred, may be exceeded as desired or required and in the case of mixtures of industrial and municipal sewage, some intermediate levels may be utilized.

It is indeed astonishing that extraordinarily high stability of the system with respect to pH shock, salt shock, toxic shock and the like results. Of course, where such shocks can be anticipated and the projected change in pH, salt concentration or toxic substance concentration is determined in advance, the make-up biomass can be determined for compensation of these shocks by simple experimental methods and the make-up biomass modified accordingly.

In general, the process of the invention is carried out such that in the adsorption stage a mean population density of procaryotae of at least 500 million procaryotae per $cm^3$ is maintained.

Under these conditions, we are able to ensure that the desired stability, cracking, adsorption and flocculation can be effected in the adsorption stage. Even better results are obtained when one utilizes 700 million procaryotae per $cm^3$ and more.

In the system of the invention it is possible to increase the volumetric loading to about 50 to 80 kg $BOD_5$ per $m^3$ per day for a system operating with the same sludge loading as is required to lower volumetric loadings of the prior art with a corresponding increase in the rate of treatment or concentration of the raw sewage.

BRIEF DESCRIPTION OF THE DRAWING

The above and other objects, features and advantages of the present invention will become more readily apparent from the following description, reference being made to the accompanying drawing in which the sole FIGURE is a flow diagram illustrating the method of the invention or a sewage treatment plant for carrying it out.

SPECIFIC DESCRIPTION

In the drawing, we show the raw effluent at 10 which may contain the requisite quantity of procaryotic microorganisms and which can be admitted at a controlled rate as represented by a controller 20 directly into an adsorption stage 30 which is an activation stage as illustrated by the admission of oxygen as represented at 31. The adsorption stage operates continuously and its outflow at 34 enters the intermediate clarifier 35 from which sludge and the cracking or splitting solids are removed as indicated at 36. These solids have a high energy value and after drying may be subjected to incineration and used as a fuel for the generation of power.

The biozone of the adsorption stage is directly separated from the next biozone as represented by the dot-dash line 40.

The effluent from this first stage is delivered at 51 to the activation biozone 50 which is supplied with oxygen as represented at 52 and which can be provided with the usual sludge recycling as shown at 53 from the final clarifier 54 into which the outflow 55 from the biozone 50 is fed. The final effluent 56 may be filtered or subjected to further treatment if desired, but generally is a fully clarified effluent while excess sludge at 57 can be wasted or treated in any desired and conventional manner.

Surprisingly, by operating the adsorption stage with procaryotae and more specifically protocytes in the form of intestinal bacteria, the raw sludge in the sewage can be converted completely into bacterial sludge so that any similarity to the fresh sludge is removed. The sludge formed in the adsorption stage is recovered in the form of large brown-black flocculate which settles readily and has a sludge index of about 50 to 70 ml/g. The sludge flocculate also precipitates bacterial masses and colonies and by adsorption or association carries down considerable quantities of colloidally suspended and otherwise nonsedimentable materials. As a consequence, substances which have in the past been difficult to eliminate or decompose by sewage treatment processes are readily removed. No eucaryotae or protozoa are found in the sludge. The active sludge tends to form plaits of strands. The adsorption stage is effective even with pH shock, salt shock, toxic shock and the like when the make-up biomass is continuously supplied. Apparently the effect is a result of the high rate at which procaryotae are freshly added to the adsorption stage and this also appears to be the reason why the active sludge in the adsorption stage has a higher organic composition than the usual active sludges.

The bacterial sludge is characterized by a high physiological activity and because of this the sewage in the adsorption stage in a relatively short treatment time is transformed into a special substrate which promotes the biological degradation process which must be carried out in the subsequent stages.

Our investigations have shown that the number of microorganisms per gram of dry substance in the active sludge is many times greater in the system of the invention than that in earlier systems with less energy cost and problems. The procaryotae with which the invention operates are viable over a range of pH units and thus are practically not susceptible to pH shock and are effective both in acid and in basic conditions. Indeed, we have found that the procaryotae which are present are of various types and mutants which tend to even increase this range further and thus broaden the boundary conditions and increase the variability between poor populations or mixed populations. The procaryotae, especially the protocytes and intestinal bacteria, grow very quickly and indeed may reproduce in the adsorption stage at a rate of at least one generation per hour. As a consequence, the procaryotae are subjected to a high level of selection processes enabling them to compensate for even comparatively short term variations in environmental conditions which might otherwise have a destablizing effect.

Indeed, when environmental effects are imposed upon the adsorption stage, the selection process among the procaryotae is such to allow compensation in periods as short as several hours. The accommodation capabilities appear to be a consequence of the smallness of the cells, their nonspecific structures and their extremely short mitosis times. The total genetic information of procaryotae is contained in a single chromosome strand and the matters of the individual procaryotae is extraordinarily small so that binary splitting results in a rapid division of the bacterial cells. It is especially advantageous that because of their small size, the surface area of a certain mass of procaryotae can be 10 times greater than the volume of the corresponding mass of eucaryotae. Since the material exchange is effected across the surface, the corresponding increase in the activity and nutrient storage capacity occurs.

The invention utilizes the fact that the intestinal flora in the intestinal tract of warm blooded creatures contains procaryotae and especially a large proportion from the bottom Euterobacteriaceae family. These Euterobacteriaceae are facultative anaerobic and have the ability of recovering energy by respiration (aerobically) and by fermentation (anaerobically).

Since the raw sewage influent to the process of the invention continuously contains such procaryotae, generally addition thereof is not required. Approximately a third of the feces consist of such bacterial mass, approximately $10^{11}$ protocytes per gram. Consequently, the high degree of process stability is a result of the continuous introduction of this combination or make-up or biomass into the adsorption stage. About one third of the bacteria mass thus introduced into the adsorption stage is completely active when, according to the invention, the sewage is introduced with preclarification or with only a partial preclarification.

The achieved improvement in stability is a consequence of the wide range of variability of procaryotae during the evolution of these intestinal bacteria in the adsorption stage and thus a consequence of the selection and mutation processes previously described. Statistical studies have shown that the usual pH shocks, salt shocks and toxic shocks to which the sewage treatment system may be subject practically immediately results in the generation of viable and resistant protocytes which immediately begin reproducing and engaging in the biological degration process to stabilize it.

In apparatus for the treatment of sewage utilizing the classical aerated sand traps, it has been found to be desirable to operate the aerated sand trap in accordance with the method of the invention. The A stage can also be operated with oxygen or with oxygen enriched air, whether it is open or in the form of a closed fermenter. In accordance with the invention, the second stage can be an activation basin as described or a trickle-filter system and, of course, further stages can be provided downstream of the second stage described.

We claim:

1. A method of treating sewage which allows an increase in volumetric loading to 50 to 80 $BOD_5$ per $m^3$ per day which comprises the steps of:
   (a) biologically degrading sewage in a first activation stage formed as an adsorption stage under aerobic or facultative anaerobic conditions with a sludge loading of at least 2 kg $BOD_5$ per kg dry substance per day with continuous flow through said adsorption stage and with a working biomass therein formed by procaryotae;
   (b) maintaining a mean population density of at least 500 million procaryotae per $cm^3$ in said adsorption stage;
   (c) withdrawing the biomass and effluent continuously from said adsorption stage and separating a first effluent therefrom;
   (d) effecting an activated sludge biological degration of said first effluent in a second treatment stage;
   (e) maintaining strict separation of the biozonoses represented by steps (a), (b) and (c) on the one hand and step (d) on the other hand; and
   (f) making the working biomass in said adsorption stage by feeding thereto raw sewage with a quantity of procaryotae which, per unit volume, is at least 1 weight percent of the working biomass per unit volume of the adsorption stage.

2. The method defined in claim 1 wherein the raw sewage introduced in step (e) of said adsorption stage is introduced directly to the adsorption stage without preclarification to control the rate at which procaryotae are added to said adsorption stage.

3. The method defined in claim 1 for the treatment of municipal sewage wherein the biomass in the raw sewage is introduced in an amount of 5 to 15 weight percent into said adsorption stage.

4. The method defined in claim 1 for the treatment of industrial sewage containing procaryotae microorganisms wherein the biomass in said raw sewage is introduced at a rate of 1 to 5 percent into the adsorption stage.

5. The method defined in claim 1 wherein said mean population density is at least 700 million procaryotae per $cm^3$.

* * * * *